(No Model.)
I. E. MYRICK.
Feed Water Heater.
No. 232,539. Patented Sept. 21, 1880.
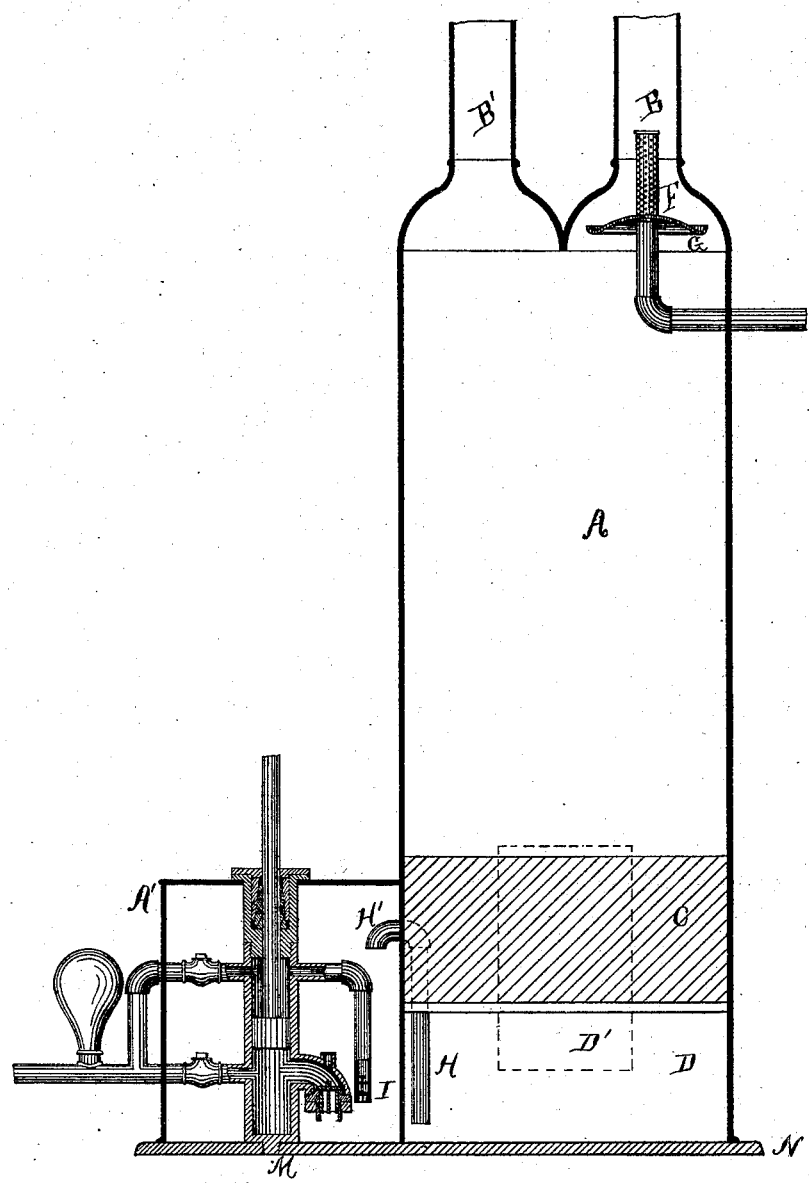
Witnesses,
A. O. Balzer
S. M. Wolcott, Jr.
Israel E. Myrick, Inventor,
By Tracy, Dyer & Wilber, Attorneys.

United States Patent Office.

ISRAEL E. MYRICK, OF CLEVELAND, OHIO, ASSIGNOR TO GEORGE W. TURNER, OF SAME PLACE.

FEED-WATER HEATER.

SPECIFICATION forming part of Letters Patent No. 232,539, dated September 21, 1880.

Application filed May 14, 1880. (No model.)

*To all whom it may concern:*

Be it known that I, ISRAEL E. MYRICK, of Cleveland, in the county of Cuyahoga and State of Ohio, have invented a new and useful Improvement in Feed-Water Heaters; and I do hereby declare that the following is a full and exact description of the same, reference being had to the accompanying drawing, and to the letters of reference marked thereon.

My invention relates to certain improvements in heaters and filters for supplying feed-water to steam-boilers, and has for its object the heating of the water supplied to a steam-boiler before it passes into the boiler with the waste or exhaust steam from the engine, to diminish the cost of fuel, as a large proportion of heat is essentially lost in the exhaust-steam, and much more fuel is required to raise to a proper temperature the cold water admitted to the boiler. My device also filters the water to free it from organic matters or other impurities it may hold in suspension, and feeds it to the boiler in a comparatively pure state, thus largely preventing scale or fouling of the flues. By the peculiar construction of my pump and valves necessary to the operations of the device I render them nearly noiseless and quite automatic, requiring little or no attention.

In the drawing I have shown a sectional vertical view of my device, in which A is the steam-chamber; B, the pipe connecting with the exhaust of the engine, and B' the outlet for the waste-steam not condensed by the water.

In operation the water from the supply-tank or street-main enters at the pipe E, and passing on to F is discharged through the perforations in fine spray. At the same time the exhaust-steam passing in at B becomes intimately associated with the spray and causes a partial condensation of the vapor and heating of the water, which falls upon the drip-cup or diaphragm G, gradually flowing over its sides and through the steam in the chamber A till, reaching the filter C, composed of sand, gravel, &c., or any suitable filtering material, it passes through to the tank D, whence, when the water has reached a sufficient height, it is drawn off through the siphon H H' into the chamber A'. This chamber contains the pump M for supplying the engine.

Having thus described my invention, what I claim as new, and desire to secure by Letters Patent, is—

1. In a feed-water heater, the combination of the pipe E F, disk G, chamber A, filtering-chamber C, and pump M, with their connections, as and for the purposes set forth and described.

2. In combination with the exhaust-steam pipe B, the water-supply pipe E, perforated at its inner end and entering such exhaust-pipe, and the diaphragm G, encircling such water-pipe below its perforated end, substantially as described and shown.

3. In combination with the chambers A A', the filter C, constructed as described, tank D, arranged below the same, and the siphon H H', as and for the purpose set forth.

This specification signed and witnessed this 11th day of March, 1880.

ISRAEL E. MYRICK.

Witnesses:
A. O. BALZER,
S. M. WOLCOTT.